United States Patent [19]
Walker et al.

[11] Patent Number: 5,543,063
[45] Date of Patent: Aug. 6, 1996

[54] METHOD FOR RECOVERING PRODUCE WASH TREATMENT EFFLUENT

[75] Inventors: John P. Walker, Spokane; Steven Hausmann, Selah, both of Wash.

[73] Assignee: Inland Aqua-Tech Equipment Systems, Inc., Spokane, Wash.

[21] Appl. No.: 389,150

[22] Filed: Feb. 15, 1995

[51] Int. Cl.$^6$ ............................ B01D 21/26; B01D 37/00
[52] U.S. Cl. .................... 210/788; 210/804; 210/805; 210/806; 210/167; 15/3.1; 15/3.14
[58] Field of Search ................ 15/3.1, 314; 210/167, 210/295, 304, 787, 788, 804, 805, 806

[56] References Cited

U.S. PATENT DOCUMENTS

| | | |
|---|---|---|
| 1,305,735 | 6/1919 | Morris . |
| 2,447,680 | 8/1948 | Bauer . |
| 2,998,138 | 8/1961 | Mould et al. . |
| 3,021,954 | 2/1962 | Allen . |
| 3,295,539 | 2/1967 | Schlageck . |
| 3,302,789 | 2/1967 | Holt . |
| 3,369,697 | 2/1968 | Kudlaty . |
| 3,397,784 | 8/1968 | Carr . |
| 3,485,369 | 12/1969 | Voorheis . |
| 3,923,658 | 12/1975 | Lancaster ............................ 210/167 |
| 4,239,368 | 12/1980 | Krause et al. . |
| 4,496,460 | 1/1985 | Haarstad et al. . |
| 4,571,301 | 2/1986 | Inskeep, Jr. ......................... 210/805 |
| 4,652,368 | 3/1987 | Ennis et al. . |
| 4,828,709 | 5/1989 | Houser et al. ....................... 210/805 |
| 5,395,537 | 3/1995 | Ellison ................................ 210/805 |

FOREIGN PATENT DOCUMENTS
0084520 1/1983 European Pat. Off. .

OTHER PUBLICATIONS
Custom Technology Co., Inc., "Automatic Screening Water Box" undated.
Andritz Sprout–Bauer, "Liquid Cyclones", pp. 1–4 undated.
Rosedale Products, Inc., "High Capacity Filter Bags for Rosedale Bag Filters", Catalog 6002–FB–2 undated.
Filtomat, Inc., "Filtomat" (Brochure) undated.

*Primary Examiner*—Robert A. Dawson
*Assistant Examiner*—David Reifsnyder
*Attorney, Agent, or Firm*—Wells, St. John, Roberts, Gregory & Matkin, P.S.

[57] ABSTRACT

A method of treating fungible produce at a wash station having a floor, comprising the steps of washing the produce, using a wash nozzle, with liquid containing a chemical treating agent. Effluent from the washing is collected in a storage tank. Liquid in the storage tank is conducted to a secondary tank, via a screen. Liquid in the secondary tank is conducted to a self-cleaning, self-backwashing filter. Back wash is conducted by gravity to a plurality of bag filters which collect particulate and discharge the filtered back wash into the secondary tank, above the screen. Liquid is conducted from the lower outlet of the self-backwashing filter to the storage tank. Liquid from the storage tank is conducted to the wash nozzle. The chemical treating agent is not filtered out by any of the filtration steps so that the chemical treating agent contained in the effluent from the washing may be reused and need not be dumped.

17 Claims, 5 Drawing Sheets

5,543,063

1

METHOD FOR RECOVERING PRODUCE WASH TREATMENT EFFLUENT

TECHNICAL FIELD

The invention relates to methods of and apparatus for treating produce. More particularly, the invention relates to methods of and apparatus for treating produce with a chemical treating agent and collecting the effluent from the treatment.

BACKGROUND OF THE INVENTION

When fungible produce, such as fruit or vegetables, is harvested, it is placed in large wooden crates or boxes. The boxes are then loaded into a truck for transportation to market. Before the truck leaves for market, it stops at a wash station. At the wash station, while the crates of produce remain on the truck, the produce is washed to remove dirt and to treat the produce with a chemical treating agent, which acts as a fungicide, pesticide, and preservative. Effluent from this washing is collected in a container, and is typically dumped when the container becomes full. Such dumping is environmentally unfriendly, and also results in waste of the chemical treating agent, which is typically expensive.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
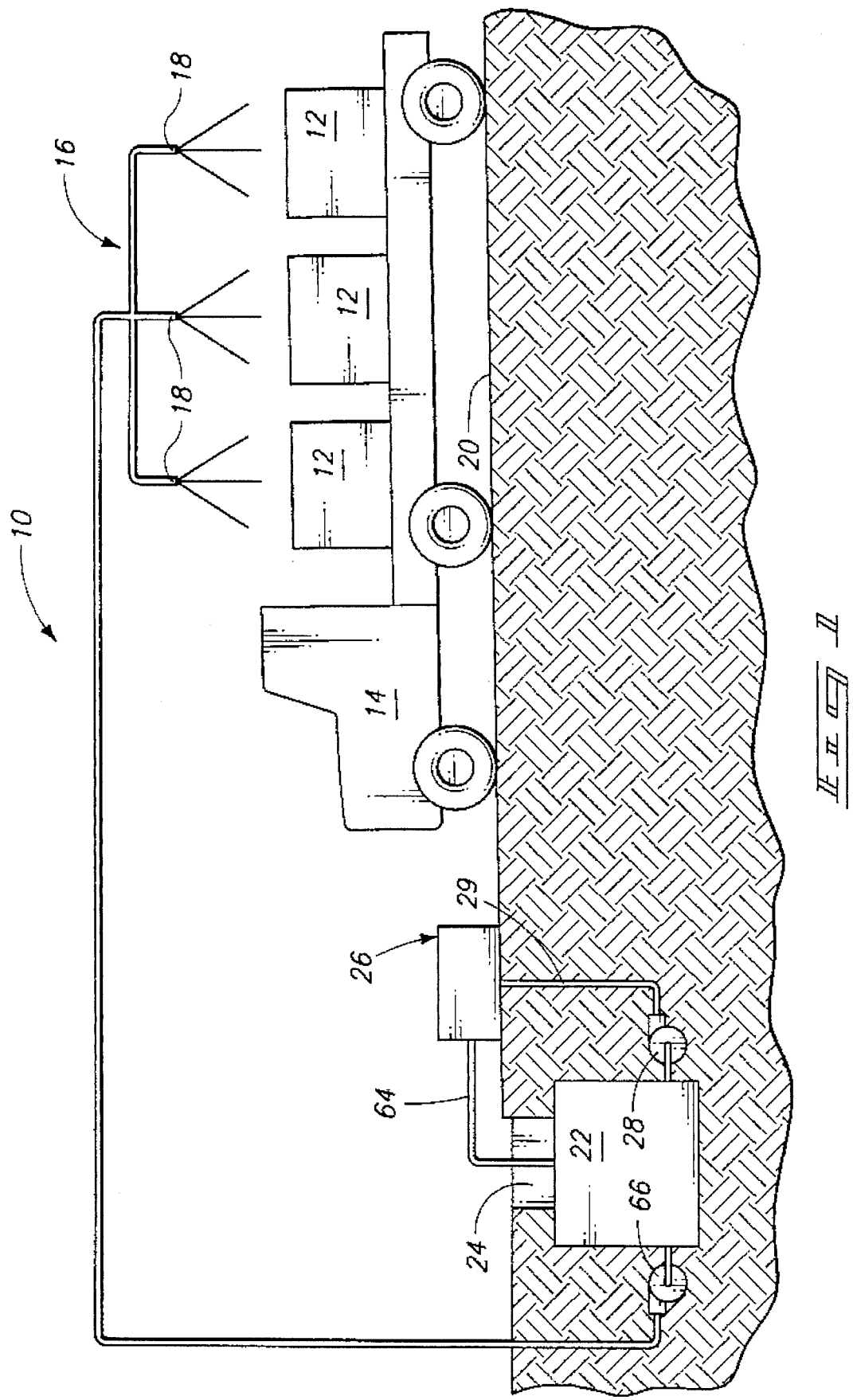
FIG. 1 is a diagrammatical view illustrating a wash station and a filtration assembly embodying various features of the invention.

This disclosure of the invention is submitted in furtherance of the constitutional purposes of the U.S. Patent Laws "to promote the progress of science and useful arts" (Article 1, Section 8).

In accordance with one aspect of the invention a method of treating fungible produce at a wash station is provided, comprising the steps of washing the produce by spraying the produce with liquid containing a chemical treating agent; collecting the effluent from the washing in a storage tank, the spraying effluent containing the chemical treating agent; pumping the washing effluent from the storage tank to a secondary tank, and screening the effluent in the secondary tank by passing the effluent through a screen in the secondary tank; pumping the screened effluent from the secondary tank to a self-cleaning, self-backwashing filter having an inlet and a main outlet, the self-cleaning, self-backwashing filter having a sensor for sensing the pressure differential between its inlet and outlet, the self-cleaning, self-backwashing filter automatically going into a back wash function when the pressure differential exceeds a predetermined value, the self-cleaning, self-backwashing filter having a back wash outlet, separate from its main outlet, through which back washed solids are expelled, and the self-cleaning, self-backwashing filter using fluid travelling from its inlet to its main outlet for the backwashing, a majority of the chemical treating agent entering the inlet of the self-cleaning, self-backwashing filter being discharged through the main outlet of the self-cleaning, self-backwashing filter; conducting the back wash by gravity to a plurality of bag filters which collect particulate and discharge the filtered back wash into the secondary tank, the bag filters providing a higher degree of filtration than the self-backwashing filter, a majority of the chemical treating agent in the back wash passing through the bag filters; conducting liquid from the lower outlet of the self-backwashing filter to the storage tank; and conducting liquid from the storage tank to the wash nozzle so that the chemical treating agent contained in the liquid is sprayed onto produce, whereby quantities of chemical treating agent contained in the effluent from the washing may be reused and need not be dumped.

In accordance with another aspect of the invention a recycling system is provided for recovering produce waste water effluent which is created when produce is washed, using a wash nozzle, with a liquid containing a chemical treating agent, the recycling system comprising a storage tank; an outlet conveying the effluent from the washing to the storage tank; a secondary tank; a conduit in fluid communication between the storage tank and the secondary tank; a screen at the open top of the secondary tank, the screen being of a mesh size effective to remove leaves from the washing effluent; a solids separating cyclone, the centrifugal filter having an inlet, the centrifugal filter having a lower outlet where solids and some quantity of liquids are discharged, and the cyclone having an upper outlet where filtrate is discharged, a majority of the chemical treating agent entering the centrifugal filter being discharged through the upper outlet of the centrifugal filter; a pump in fluid communication with the secondary tank and the centrifugal filter inlet, the pump being positioned to pump the screened effluent from the secondary tank to the cyclone inlet; a settling tank having an upper end below the cyclone lower outlet, the settling tank collecting the output from the cyclone lower outlet, and the settling tank having an upper overflow outlet in fluid communication with the secondary tank, above the screen; a self-cleaning, self-backwashing filter having an upper inlet in fluid communication with the centrifugal filter upper outlet, the self-cleaning, self-backwashing filter having a lower outlet, the self-cleaning, self backwashing filter having a screen of a predetermined mesh size between its lower outlet and upper inlet, the self-cleaning, self-backwashing filter having a sensor for sensing a pressure differential between its upper inlet and lower outlet, the self-cleaning, self-backwashing filter automatically going into a back wash function when the pressure differential exceeds a predetermined value, the self-cleaning, self-backwashing filter having a back wash outlet, separate from its lower outlet, through which back washed solids are expelled, and the self-cleaning, self-backwashing filter using fluid travelling from its inlet to its outlet for the backwashing, a majority of the chemical treating agent entering the upper inlet of the self-cleaning, self-backwashing filter being discharged through the lower outlet of the self-cleaning, self-backwashing filter; a plurality of bag filters below the back wash outlet, the bag filters collecting particulate, the bag filters discharging the filtered backwash into the secondary tank, above the tank screen, and the bag filters having a mesh size smaller than the mesh size of the screen of the self-cleaning, self-backwashing filter, a majority of the chemical treating agent entering the bag filters being discharged through the bag filters; and a conduit in fluid communication between the lower outlet of the self-backwashing filter and the wash nozzle; whereby the chemical treating agent is reused and need not be dumped.

Shown in FIG. 1 is a recycling system 10 for recovering produce waste water effluent which is created when containers 12 of produce are washed. When fungible produce, such as fruit or vegetables, is harvested, it is placed in the containers 12 which are typically large wooden crates or boxes. The containers 12 are then loaded into a vehicle 14, such as a truck, for transportation to market. Before the vehicle 14 leaves for market, it stops at a wash station 16.

The wash station 16 has one or more overhead wash nozzles 18, and has a floor 20. At the wash station 16, the produce is washed, using the wash nozzles 18, with liquid containing a chemical treating agent while the produce remains in the containers 12 and the containers 12 remain in the vehicle 14. The chemical treating agent is preferably one that enhances storage of the produce and limits biological degradation. The chemical treating agent may comprise, for example, a pesticide, a fungicide, a preservative, or a combination of these. An example of a chemical treating agent is sold under the mark "Merteck". The system 10 further includes a storage tank 22, under the floor 18, having an inlet 24. A sewer grate or a screen is optionally provided at the inlet 24. The floor 20 is inclined to lead effluent from the washing to the inlet 24 of the storage tank 22. In the illustrated embodiment, the storage tank 22 is located underground; however, in alternative embodiments, the storage tank 22 may be located above ground but below a ramp which supports the vehicle 12. In the illustrated embodiment, the tank 22 is a 200 gallon tank.

The system 10 further includes a filtration assembly 26, and a pump 28 in fluid communication between the storage tank 22 and the filtration assembly 26.

Figure 2:
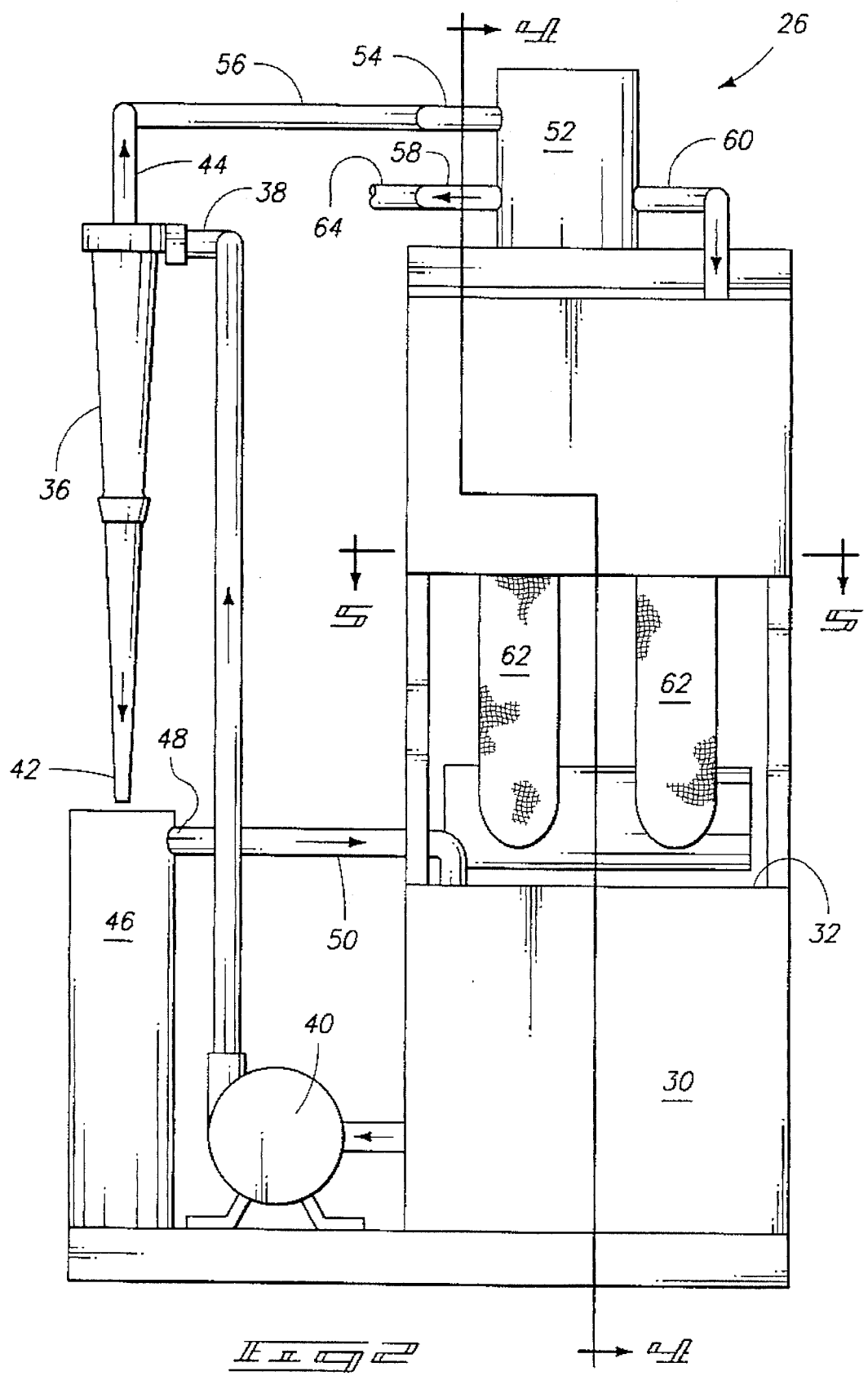
FIG. 2 is a front elevational view of the filtration assembly of FIG. 1.
Figure 3:
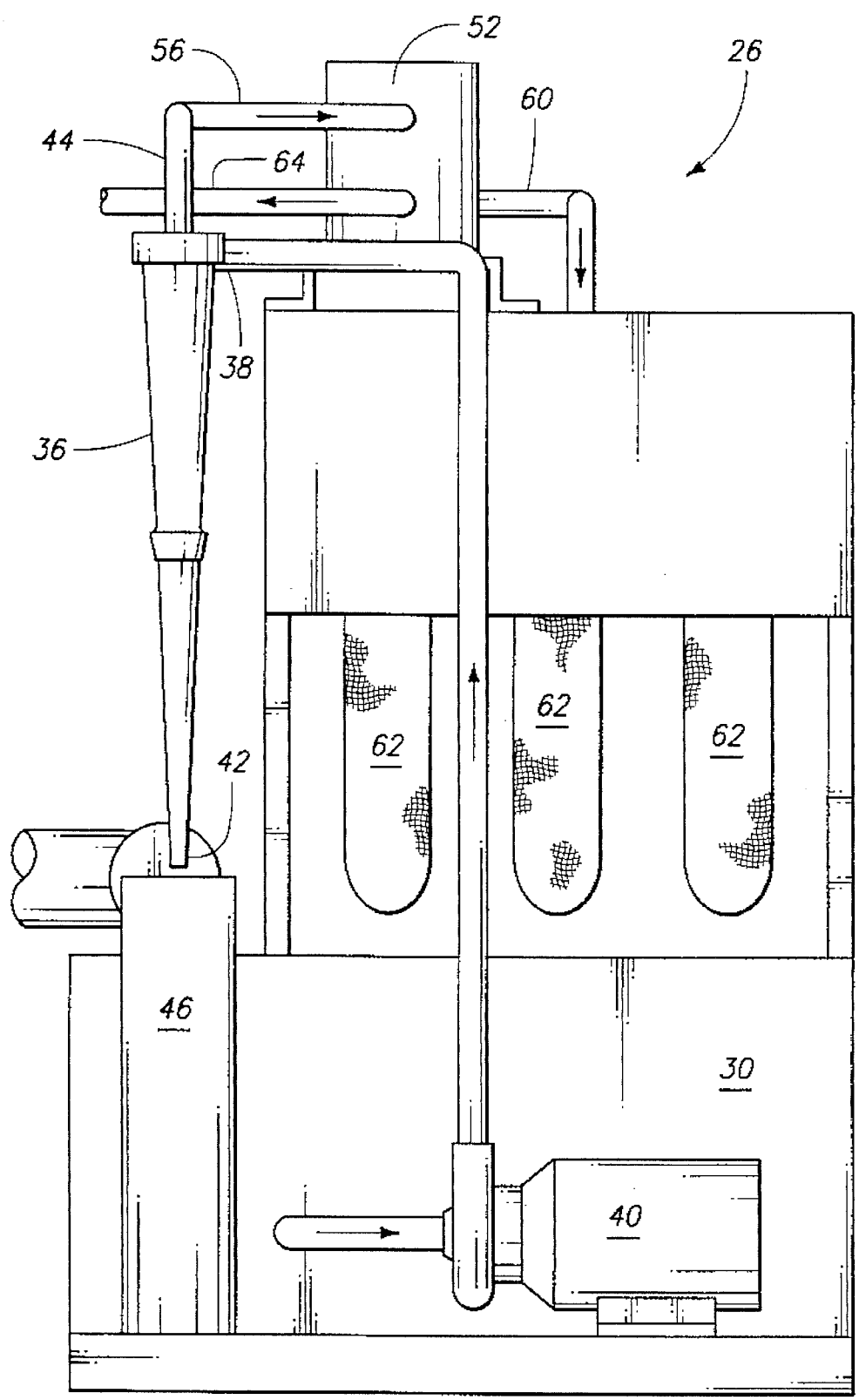
FIG. 3 is a side elevational view of the filtration assembly of FIG. 1.
Figure 4:
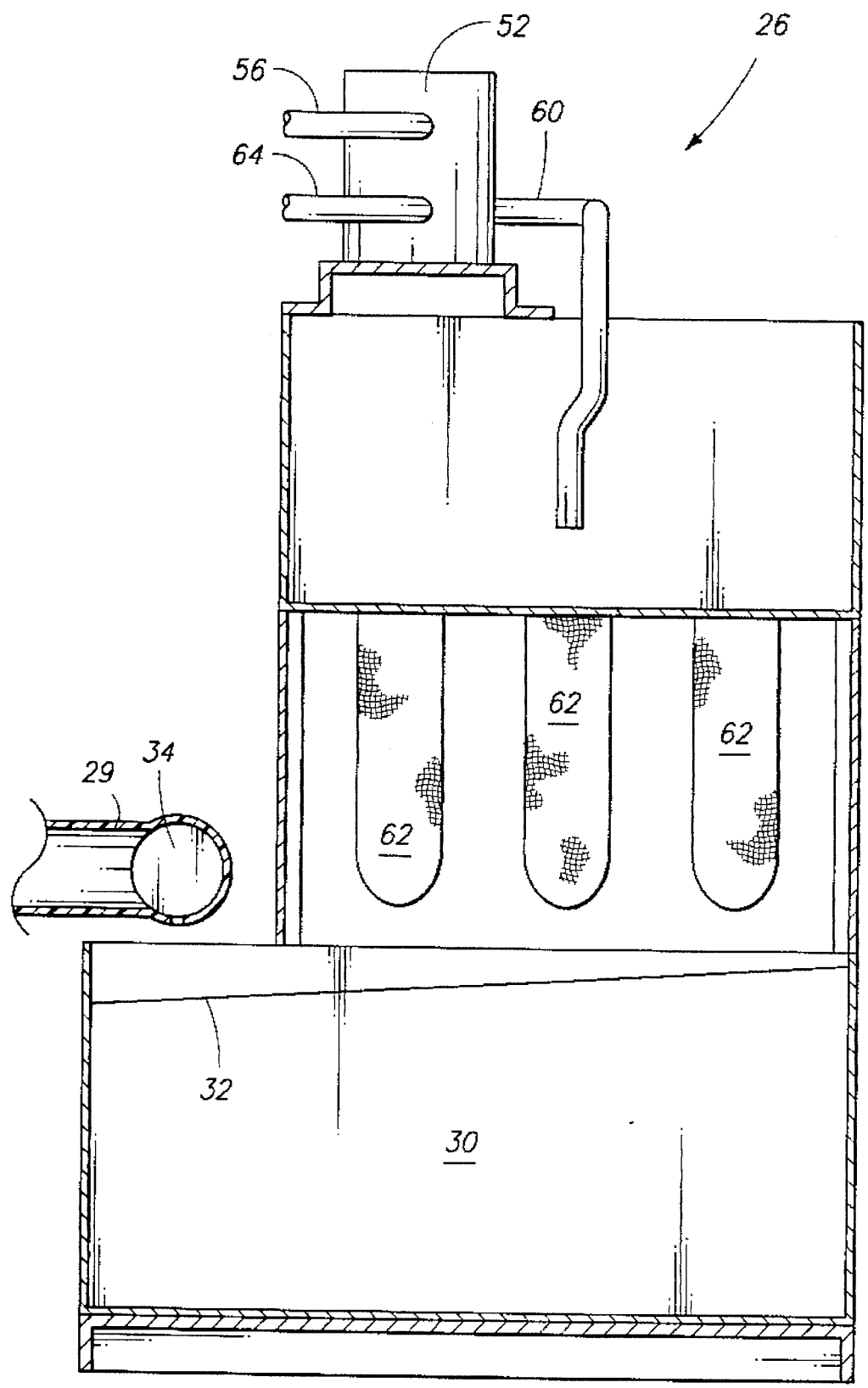
FIG. 4 is a sectional view taken along line 4—4 of FIG. 2
Figure 5:
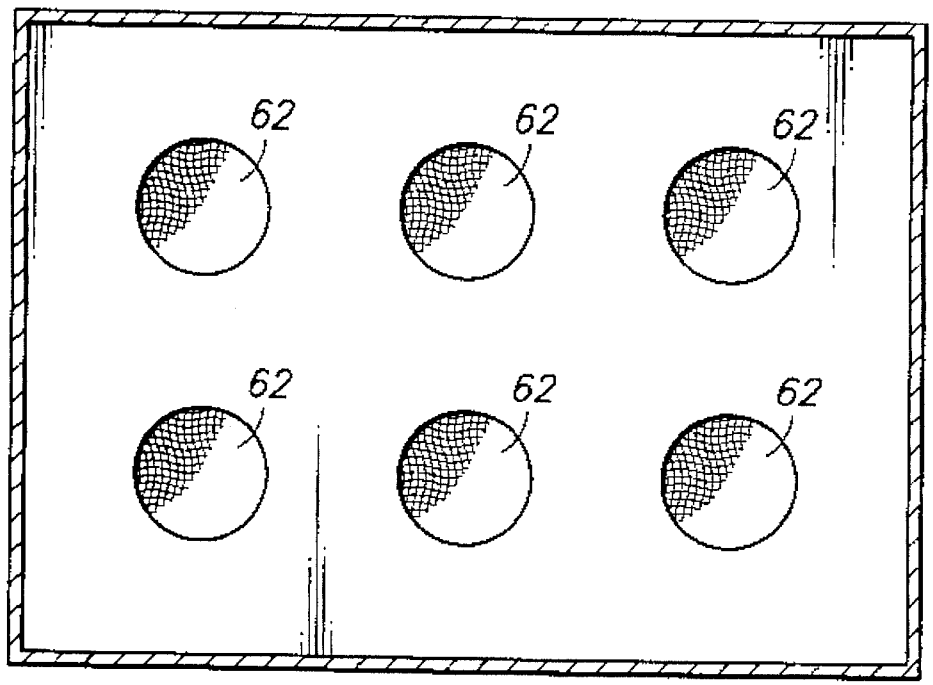
FIG. 5 is a sectional view taken along line 5—5 of FIG. 2.

The filtration assembly 26 includes a secondary tank 30 (FIGS. 2–4), and a tilted screen 32 at the top of the secondary tank 30. The pump 28 pumps liquid, including effluent from the washing, from the storage tank 22 via a pipe 29 to a location 34 above the screen 32, and the liquid passes through the screen 32 into the secondary tank 30. The screen 32 removes leaves and large debris.

The filtration assembly 26 further includes a cyclone 36, having an inlet 38. The filtration assembly 26 further includes a pump 40 in fluid communication between the secondary tank 30 and the centrifugal filter 36. The pump 40 delivers fluid from the secondary tank 30 to the centrifugal filter 36. The centrifugal filter 36 generally separates solids from liquids, and has a lower outlet 42 where solids and some quantity of liquids are discharged. The cyclone 36 also has an upper outlet 44 where filtrate is discharged. The cyclone 36 does not filter out the chemical treating agent. In other words, a majority of the chemical treating agent that enters the centrifugal filter 36 is discharged through the upper outlet 44 of the centrifugal filter 36. In the illustrated embodiment, the centrifugal filter 36 is a cyclone filter sold by Andritz Sprout-Bauer of Muncy, Pa. under the name "Liquid Cyclone".

The filtration assembly 26 further includes a settling tank 46 collecting the output from the lower outlet 42 of the centrifugal filter 36. The settling tank 46 has a volume which is sufficiently large, relative to the velocity of discharge from the lower outlet 42, such that solids settle at the bottom of the settling tank 46. The settling tank 46 has an upper overflow outlet 48, and the filtration assembly 26 further includes a conduit 50 which conducts any overflow from the upper overflow outlet 48 to a location above the screen 32, for delivery into the secondary tank 30. The settling tank 46 is periodically manually emptied.

The filtration assembly 26 further includes a self-cleaning, self-backwashing filter 52 having an upper inlet 54, and a conduit 56 in fluid communication between the upper outlet 44 of the centrifugal filter 36 and the upper inlet 54 of the self-cleaning, self-backwashing filter 52. The conduit 56 conducts filtrate from the centrifugal filter 36 to the self-cleaning, self-backwashing filter 52 for further filtration. The filter 52 further has a lower outlet 58, and has a sensor (not shown) for sensing the pressure differential between the upper inlet 54 and the lower outlet 58. The filter 52 further has screen elements (not shown) between the upper inlet 54 and lower outlet 58. The self-cleaning, self-backwashing filter 52 automatically goes into a back wash function, to clean the internal screen elements and wash out particulate matter, when the pressure differential sensed by the sensor exceeds a predetermined value. The self-cleaning, self-backwashing filter 52 further has a back wash outlet 60, separate from its lower outlet 58, through which back washed solids are expelled, and the filter 52 uses as backwashing fluid the same fluid that is being filtered. In other words, the filter 52 uses fluid travelling from its inlet 54 to its outlet 58 for the backwashing. The filter 52 does not filter out the chemical treating agent. In other words, a majority of the chemical treating agent that enters the upper inlet 54 of the filter 52 is discharged through the lower outlet 58. A suitable filter 52 is sold by Filtomat, Inc. of Los Angeles, Calif.

The back-washing must occur for a considerable duration of time in order to clean the screen elements in the filter 52. This would result in a large quantity of back-wash being emitted to the environment absent some arrangement to capture the backwash.

Therefore, the filtration assembly 26 further includes a plurality of bag filters 62, and back wash from the outlet 58 is conducted by gravity to the bag filters 62. The bag filters 62 are positioned above the secondary tank 30 and the screen 32. The bag filters 62 collect particulate and discharge the filtered back wash into the secondary tank 30, above the screen 32. The bag filters 62 have a mesh size smaller than the mesh size of the filter screen elements of the self-cleaning, self-backwashing filter 52. The bag filters 62 do not filter out the chemical treating agent which is present in the back wash. In other words, a majority of the chemical treating agent in the back wash passes through the bag filters 62. A suitable bag filter 62 is sold by Rosedale Products, Inc. of Ann Arbor, Mich. The bag filters 62 are periodically manually emptied.

The recycling system 10 further includes a conduit 64 in fluid communication between the outlet 56 of the filter 52 and the storage tank 22. The conduit 64 conducts filtered liquid from the outlet 56 of the filter 52 to the storage tank 22.

The recycling system 10 further includes a pump 66 conducting liquid from the storage tank 22 to the overhead wash nozzles 18 so that the chemical treating agent contained in the liquid is sprayed onto produce. The filtration assembly 26 operates continuously to clean liquid in the storage tank 22 so that liquid that is sprayed onto produce using the nozzles 18 is sufficiently clean. Fresh water is periodically manually added to the storage tank 22 to make up for evaporation and liquid carried away by vehicles 14 after they leave the wash station 16. Quantities of the chemical treating agent are periodically added to the storage tank 22 to maintain the concentration of the chemical treating agent relative to water.

Thus, a system has been disclosed whereby quantities of chemical treating agent contained in the effluent from washing of produce at a wash station may be reused and need not be dumped.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of treating fungible produce at a wash station, comprising the steps of:
   washing the produce by spraying the produce with liquid containing a chemical treating agent;
   collecting the effluent from the washing in a storage tank, the spraying effluent containing the chemical treating agent;
   pumping the washing effluent from the storage tank to a secondary tank, and screening the effluent in the secondary tank by passing the effluent through a screen in the secondary tank;
   pumping the screened effluent from the secondary tank to a self-cleaning, self-backwashing filter having an inlet and a main outlet, the self-cleaning, self-backwashing filter having a sensor for sensing the pressure differential between its inlet and outlet, the self-cleaning, self-backwashing filter automatically going into a back wash function when the pressure differential exceeds a predetermined value, the self-cleaning, self-backwashing filter having a back wash outlet, separate from its main outlet, through which back washed solids are expelled, and the self-cleaning, self-backwashing filter using fluid travelling from its inlet to its main outlet for the backwashing, a majority of the chemical treating agent entering the inlet of the self-cleaning, self-backwashing filter being discharged through the main outlet of the self-cleaning, self-backwashing filter;
   conducting the back wash by gravity to a plurality of bag filters which collect particulate and discharge the filtered back wash into the secondary tank, the bag filters providing a higher degree of filtration than the self-backwashing filter, a majority of the chemical treating agent in the back wash passing through the bag filters;
   conducting liquid from the lower outlet of the self-backwashing filter to the storage tank; and
   conducting liquid from the storage tank to the wash nozzle so that the chemical treating agent contained in the liquid is sprayed onto produce, whereby quantities of chemical treating agent contained in the effluent from the washing may be reused and need not be dumped.

2. A method according to claim 1 and further comprising, prior to said washing step, the step of using a vehicle to transport the produce to the wash station, wherein said washing step is performed while the produce remains in the vehicle.

3. A method according to claim 2 and further comprising the step of periodically adding water to the storage tank to make up for evaporation and liquid carried away by the vehicle.

4. A method according to claim 3 and further comprising the step of periodically adding chemical treating agent to the storage tank.

5. A method according to claim 1 wherein the chemical treating agent comprises a pesticide.

6. A method according to claim 1 wherein the chemical treating agent comprises a fungicide.

7. A method according to claim 1 where the screened effluent pumped from the storage tank is sent to a cyclone, upstream of the self-cleaning, self-backwashing filter, the cyclone separating solids from the effluent.

8. A method according to claim 7 wherein the cyclone has a first outlet where solids and some quantity of liquids are discharged, and has a second outlet where filtrate is discharged, and further comprising the step of collecting the output from the first outlet of the centrifugal filter in a settling tank.

9. A method according to claim 8 wherein the settling tank has a volume which is sufficiently large, relative to the velocity of discharge from the first outlet of the cyclone, such that solids settle at the bottom of the settling tank.

10. A method according to claim 8 wherein the settling tank has an upper overflow outlet, and wherein overflow from the upper overflow outlet is conducted into the secondary tank.

11. A method of treating fungible produce comprising the steps of:
    packing produce into open containers;
    transporting the packed containers to a wash station having an overhead wash nozzle and having a floor which is inclined to lead to an inlet of a storage tank under the floor;
    washing the produce, using the wash nozzle, with liquid containing a chemical treating agent while the produce remains in the containers and the containers remain in the vehicle, such that effluent from the washing passes to the floor and travels by gravity along the floor to the inlet, the effluent containing the chemical treating agent;
    collecting, using gravity, the effluent which passes through the inlet, in the storage tank;
    pumping the washing effluent from the storage tank to a secondary tank, and screening the washing effluent in the secondary tank, to remove leaves and large debris, by passing the washing effluent through a screen in the secondary tank;
    pumping the screened effluent from the secondary tank to a cyclone which separates solids from the effluent, the cyclone having a lower outlet where solids and some quantity of liquids are discharged, and the cyclone having an upper outlet where filtrate is discharged, a majority of the chemical treating agent entering the cyclone being discharged through the upper outlet of the cyclone;
    collecting the output from the lower outlet of the cyclone in a settling tank having a volume which is sufficiently large, relative to the velocity of discharge from the lower outlet, such that solids settle at the bottom of the settling tank, the settling tank having an upper overflow outlet;
    conducting overflow from the upper overflow outlet into the secondary tank, above the screen;
    conducting the filtrate from the upper outlet of the cyclone to a self-cleaning, self-backwashing filter having an upper inlet and a lower outlet, the self-cleaning, self-backwashing filter having a sensor for sensing the pressure differential between its upper inlet and lower outlet, the self-cleaning, self-backwashing filter automatically going into a back wash function when the pressure differential exceeds a predetermined value, the self-cleaning, self-backwashing filter having a back wash outlet, separate from its lower outlet, through which back washed solids are expelled, and the self-cleaning, self-backwashing filter using fluid travelling from its inlet to its outlet for the backwashing, a majority of the chemical treating agent entering the upper inlet of the self-cleaning, self-backwashing filter being discharged through the lower outlet of the self-cleaning, self-backwashing filter;

conducting the back wash by gravity to a plurality of bag filters which collect particulate and discharge the filtered back wash into the tank, above the screen, the bag filters providing a higher degree of filtration than the self-backwashing filter, a majority of the chemical treating agent in the back wash passing through the bag filters;

conducting liquid from the lower outlet of the self-backwashing filter to the storage tank; and conducting liquid from the storage tank to the overhead wash nozzle so that the chemical treating agent contained in the liquid is sprayed onto produce, whereby quantities of chemical treating agent contained in the effluent from the washing may be reused and need not be dumped.

12. A method according to claim 11 wherein said transporting step comprises using a self propelled vehicle having an internal combustion engine.

13. A method according to claim 12 wherein said washing step comprises washing the produce while the containers remain in the vehicle.

14. A method according to claim 11 wherein the chemical treating agent comprises a pesticide.

15. A method according to claim 11 wherein the chemical treating agent comprises a fungicide.

16. A method according to claim 11 and further comprising the step of periodically adding water to the storage tank to make up for evaporation and liquid carried away by the vehicle.

17. A method according to claim 11 and further comprising the step of periodically adding chemical treating agent to the storage tank.

* * * * *